US006727821B2

(12) United States Patent
Weekes et al.

(10) Patent No.: US 6,727,821 B2
(45) Date of Patent: Apr. 27, 2004

(54) APPARATUS AND METHOD FOR PREDICTING AN OVERLOAD TRIP FOR AN ELECTRICAL POWER TRANSFORMER

(75) Inventors: Mark Anthony Weekes, Winnipeg (CA); Robert George Coish, Winnipeg (CA); Zhiying Zhang, Winnipeg (CA); Glenn William Swift, Winnipeg (CA)

(73) Assignee: Perseus 2000, LLC, Washington, DC (US)

( * ) Notice: Subject to any disclaimer, the term of this patent is extended or adjusted under 35 U.S.C. 154(b) by 0 days.

(21) Appl. No.: 10/093,967

(22) Filed: Mar. 11, 2002

(65) Prior Publication Data

US 2002/0180611 A1 Dec. 5, 2002

Related U.S. Application Data

(63) Continuation-in-part of application No. 09/617,761, filed on Jul. 17, 2000, now Pat. No. 6,424,266.

(51) Int. Cl.[7] .............................................. G08B 17/00
(52) U.S. Cl. ...................... 340/588; 340/643; 340/646; 340/662; 700/292
(58) Field of Search ................................ 340/588, 635, 340/643, 664, 646, 584, 662, 310.02; 700/292; 714/25

(56) References Cited

U.S. PATENT DOCUMENTS

| | | | |
|---|---|---|---|
| 3,793,559 A | * | 2/1974 | Ristuccia .................. 317/14 R |
| 3,797,314 A | | 3/1974 | Lampe et al. .................. 73/350 |
| 3,821,605 A | * | 6/1974 | Pendrak .................... 317/14 R |
| 3,855,503 A | * | 12/1974 | Ristuccia .................. 317/27 R |
| 4,148,086 A | | 4/1979 | Landa et al. ................... 361/37 |
| 4,249,170 A | * | 2/1981 | Cham et al. ................. 340/646 |
| 4,258,570 A | | 3/1981 | Weller .......................... 73/350 |
| 4,573,132 A | | 2/1986 | Boothman et al. ........... 364/557 |
| 4,623,265 A | * | 11/1986 | Poyser ........................ 374/152 |
| 4,654,806 A | | 3/1987 | Poyser et al. ................ 364/551 |
| 4,754,405 A | | 6/1988 | Foster ......................... 364/557 |
| 4,775,245 A | | 10/1988 | Hagerman et al. ........... 374/134 |
| 4,839,770 A | | 6/1989 | Ruta ............................ 361/93 |

* cited by examiner

Primary Examiner—Benjamin C. Lee
Assistant Examiner—Phung T. Nguyen

(57) ABSTRACT

An apparatus for monitoring and controlling the operation of an electrical power transformer includes a processor with input transducers for providing to the processor inputs indicative of electrical current in a winding of the transformer and ambient temperature outside the transformer. The processor is arranged using an algorithm based upon heat transfer to repeatedly calculate a first prediction, based upon the present values of electrical current and ambient temperature, of a time period before the hot spot temperature exceeds a pre-set allowable maximum and a second prediction, based upon the current value of power, of a time period before the accumulated loss of life exceeds a pre-set allowable maximum. If the shorter time period of the two calculations is less than a pre-set value, for example one half hour, the processor generates an alarm signal and a display counting down the time remaining in the period, together with a second alarm signal at a shorter second time of for example one quarter hour.

31 Claims, 2 Drawing Sheets

APPARATUS AND METHOD FOR PREDICTING AN OVERLOAD TRIP FOR AN ELECTRICAL POWER TRANSFORMER

This application is a Continuation-in-Part Application of application, Ser. No: 09/617,761, filed Jul. 17, 2000 now U.S. Pat. No. 6,424,266.

This invention relates to an apparatus for preventing thermal damage to an electrical power transformer.

BACKGROUND OF THE INVENTION

Electrical power transformers have been used for many years and have been changed little in design over those years. They are normally cooled by circulating oil through the windings and the conductors are insulated from each other with cellulose, that is, paper. If the cellulose insulation gets too hot for too long a time, it can become structurally weak and allow the conductors to touch each other causing a catastrophic short-circuit.

"Current" in a power transformer is defined as the electrical current in one of the main windings.

"Hot Spot Temperature" in a transformer is defined as the temperature of the cellulose insulation within the transformer, at its hottest location. This temperature is usually a calculated value, since the location and parameters for a particular transformer design are not usually known accurately.

An alternative is a measured hot spot temperature: the maximum of several fiber-optic-sensed temperatures at carefully selected points within the transformer. This is an expensive and delicate method; hence the widespread use of the usual calculated method.

"Thermal Damage" in a power transformer is defined as structurally-weakened cellulose insulation within the transformer.

The structural damage is cumulative, that is, if the strength is reduced by a certain amount during an over-temperature condition, then the insulation does not recover its strength; and subsequent over-temperature conditions cause additional damage.

"Loss of Life" is the accumulated damage to insulation at the hottest spot location. It is defined by a mathematical function taken from a Guide of the Institute of Electrical and Electronics Engineers: C57.91-1995 "IEEE Guide for Loading Mineral Oil Immersed Transformers." It depends on two factors: the degree of excessive hot spot temperature and the time over which the condition persists.

"Total loss of life" of the insulation in a power transformer is defined as the condition for which the cellulose insulation has reached a proportion—such as one-half—of its original structural strength.

Up till now, thermal damage has been assumed to occur either when a current limit has been exceeded or when a hot spot temperature limit has been exceeded.

SUMMARY OF THE INVENTION

It is one object of the present invention therefore to provide an improved apparatus for preventing thermal damage to an electrical power transformer.

According to one aspect of the invention there is provided an apparatus for preventing thermal damage to an electrical transformer comprising:

a processor an input current transducer, an input ambient temperature transducer, means for an operator to enter a setting of loss of life limit beyond which thermal damage would occur, an output trip contact arranged to be activated when the setting is exceeded, an output alarm contact arranged to be closed by the processor, the processor being arranged to repeatedly calculate a time based on a prediction algorithm that uses as input the present value of current and the present value of ambient temperature and to close the output alarm contact when the prediction algorithm predicts a trip condition in a time less than a given value, such as thirty minutes.

Preferably the processor is arranged to begin the accumulated loss of life calculation only when the hot spot temperature exceeds its normal rated value.

Preferably the processor is arranged to reset its calculated accumulated loss of life to zero whenever the hot spot temperature falls below its normal rated value.

Preferably there is provided a second output alarm contact arranged to be closed when the prediction algorithm predicts a trip condition in a time less than a smaller value, such: as fifteen minutes.

Preferably the set time period, for example one half hour, is selected so as to provide the operator with a sufficient period of time to take effective remedial action.

Preferably the calculation is carried out on the assumption that the present current and ambient temperature will remain unchanged during the set time period.

Preferably there is provided a time display and wherein the processor is arranged to indicate on the time display a remaining portion of time from the present time to the time at which the setting would be exceeded.

Preferably the processor is arranged to cancel the alarm condition in the event a calculated time period of any subsequent calculation is greater than the predetermined set time period.

Preferably there is also provided an output contact that closes at a set maximum value of hot spot temperature regardless of whether or not the accumulated loss of life limit has been reached.

Preferably the hot spot temperature trip is included in the prediction algorithm.

Preferably if either the accumulated loss of life setting is exceeded or the hot spot temperature setting is exceeded the prediction algorithm generates an alarm contact closure.

The invention as defined above therefore provides an electronic hardware-software combination that predicts when the insulation in an electrical power transformer will suffer undesirable thermal damage, up to say thirty minutes before such thermal damage would occur. An alarm output contact closes, and a "time-to-trip" countdown begins, from thirty minutes down to zero, at one minute intervals. If conditions change, that is remedial action is taken to alleviate the condition, then the prediction system continuously re-predicts.

BRIEF DESCRIPTION OF THE DRAWINGS

One embodiment of the invention will now be described in conjunction with the accompanying drawings, in which.

In the drawings like characters of reference indicate corresponding parts in the different figures.

DETAILED DESCRIPTION OF PREFERRED EMBODIMENTS

Figure 1:
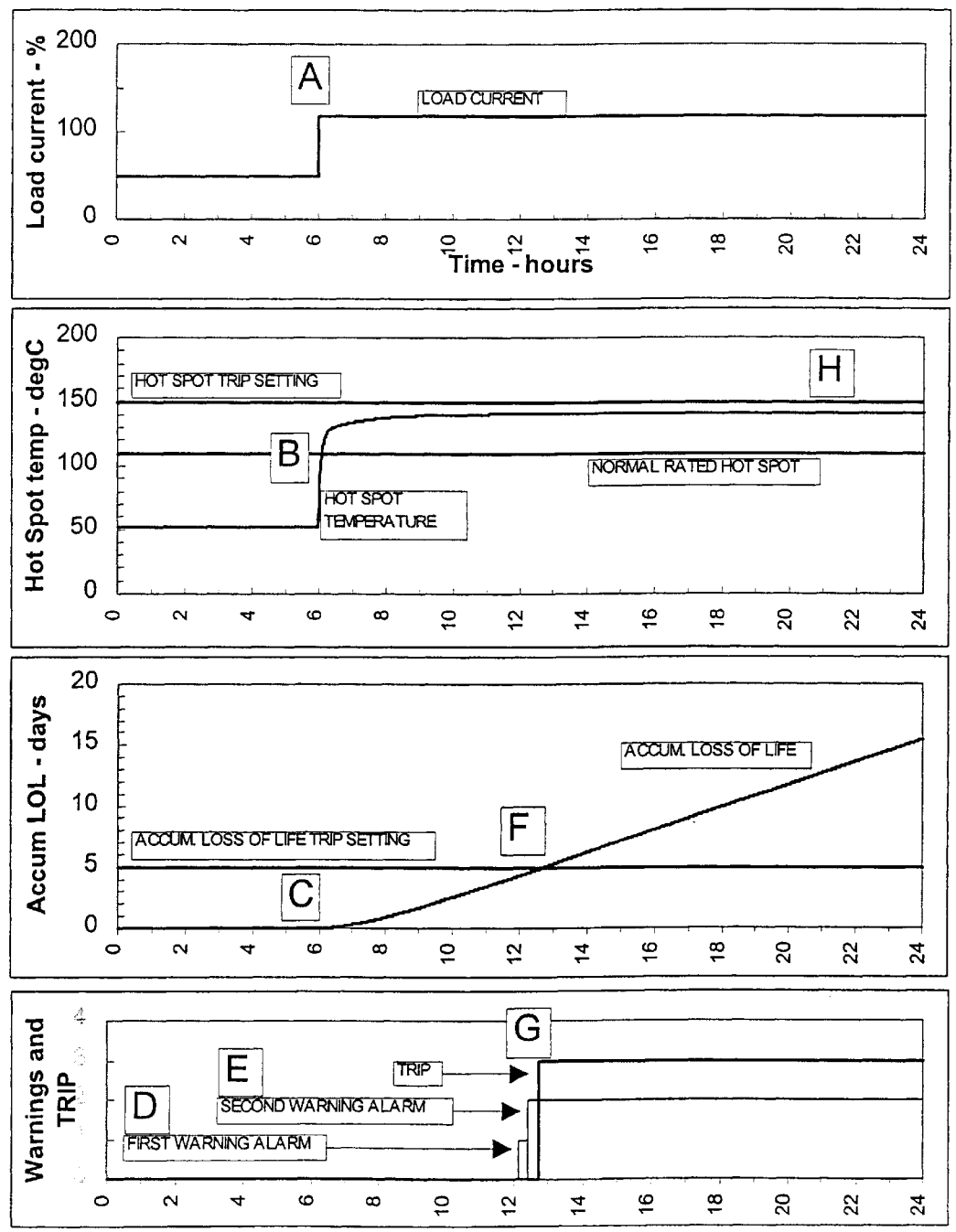
FIG. 1 is a set of four graphs of load current, hot spot temperature, accumulated loss of life, warnings and trip, versus time for an apparatus according to the present invention.
Figure 2:
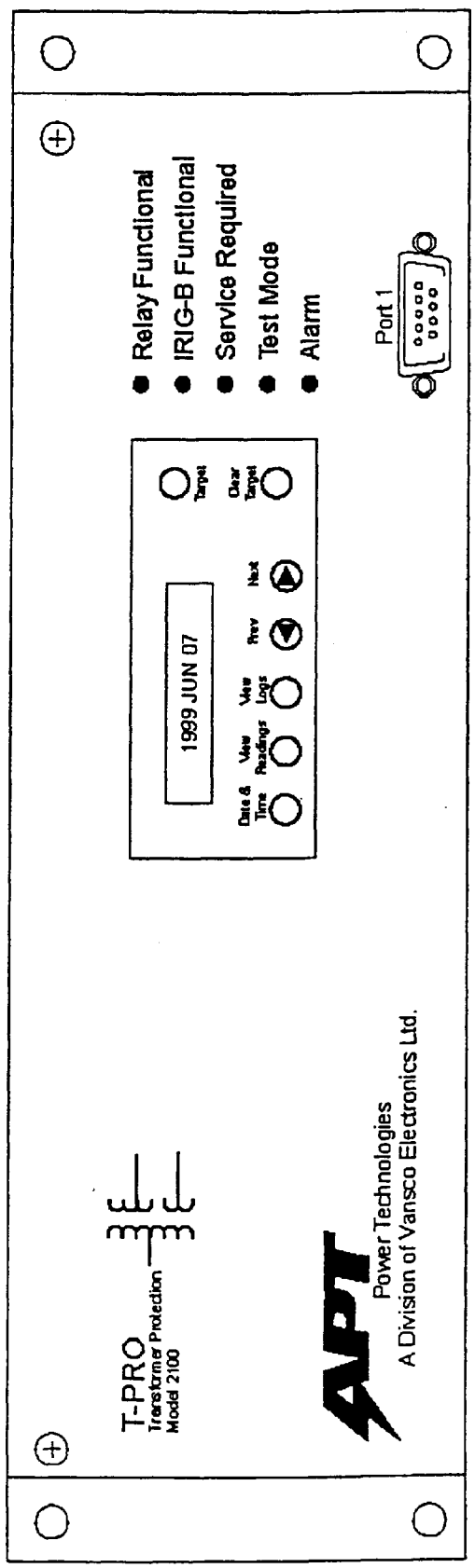
FIG. 2 is a front elevational view of the apparatus.

From a temperature sensor and a load current sensor, the device calculates the present hot spot temperature. The temperature sensor can be responsive to the ambient temperature or to a sensed temperature within the transformer itself.

If the hot spot temperature is below a loss of life pickup threshold value, the accumulated loss of life calculation is reset to zero.

The calculation proceeds as follows:

(1) Calculation of Hot Spot Temperature

Variables (functions of time, t)

$\Theta_A$=ambient temperature, ° C.
$\Theta_{TO}$=top oil temperature, ° C.
$\Theta_H$=hot spot temperature, ° C.
$\Delta\Theta_H$=hot spot rise above top oil temperature, ° C.
$\Delta\Theta_{H,U}$=ultimate hot spot temperature rise over top oil (for a given load current), ° C.
$\Delta\Theta_{TO,U}$=ultimate top oil temperature rise over ambient (for a given load current), ° C.
K=load current, per unit Parameters (Constants)

$\Delta\Theta_{TO,R}$=rated top oil temperature rise over ambient, ° C.
$\Delta\Theta_{H,R}$=rated hot spot temperature rise over top oil, ° C.
$\tau_{TO}$=top oil rise time constant, hours
$\tau_H$=hot spot rise time constant, hours
R=ratio of load loss at rated-load to no-load loss at applicable tap position, dimensionless
m=empirically derived exponent, dependent on the cooling method, dimensionless
n=empirically derived exponent, again dependent on the cooling method, dimensionless Equations At each time step, calculate the ultimate top oil rise from the load current at that instant, using $$\Delta\Theta_{TO,U} = \Delta\Theta_{TO,R}\left[\frac{K^2R+1}{R+1}\right]^n \quad (1)$$

From this, and the ambient temperature at each time step, solve the following differential equation for the top oil temperature $\Theta_{TO}$.

$$\tau_{TO}\frac{d\Theta_{TO}}{dt} = [\Delta\Theta_{TO,U} + \Theta_A] - \Theta_{TO} \quad (2)$$

Calculate the ultimate hot spot rise using $$\Delta\Theta_{H,U}=\Delta\Theta_{H,R}K^{2m} \quad (3)$$

From this, solve the following differential equation for the hot spot rise $\Delta\Theta_H$:

$$\tau_H\frac{d\Delta\Theta_H}{dt} = \Delta\Theta_{H,U} - \Delta\Theta_H \quad (4)$$

Finally, add the top oil temperature to the hot spot rise to get the hot spot temperature $\Theta_H$:

$$\Theta_H=\Theta_{TO}+\Delta\Theta_H \quad (5)$$

(2) Calculation of Loss of Life

The rate at which life of the transformer insulation is lost is given by $$\frac{dL}{dt} = e^{[\frac{15000}{383}]-[\frac{15000}{\Theta_H+273}]} \quad (6)$$

where L is the loss of life,
d/dt is the differential operator,
e is the base of natural logarithms,
$\Theta_H$ is the hot spot temperature.

At each time step, the equation is integrated to give the loss of life at that time.

The loss of life is the integral of the rate of loss of life:

$$L = \int_0^T \left[\frac{dL}{dt}\right]dt \quad (7)$$

where T is the period of integration.

On the assumption that the ambient temperature and load current are most likely to remain at their present values, into the future, the foregoing differential equations are used to predict the time at which either (1) hot spot temperature or (2) loss of life would exceed the settings levels defined and set by the user as excessive hot spot temperature or excessive loss of life, respectively. These settings are entered by means of a personal computer connected by cable through a serial port on the apparatus.

If both levels are below the settings at a time which is thirty minutes or less into the future, no action is taken.

A thirty minute warning alarm is generated if the time is thirty minutes or less and greater than fifteen minutes. This time is selected such that it gives an operator time to take remedial action to rectify the problem leading to this condition without necessity for shut downs which could cause blackout. The set time can be varied if required.

A fifteen minute warning alarm is generated if the time is equal to or less than fifteen minutes.

If the calculated time until trip is thirty minutes or less, a time-to-trip message is generated, indicating the minutes left until the excessive hot spot temperature or excessive loss of life condition is predicted to happen.

If remedial action is taken in response to an alarm, that is, the load current is reduced by system operators, then the calculation continuously re-calculates using the new load current as the assumed steady load current into the future.

The algorithm by which the hot spot temperature is calculated and the time period before that hot spot temperature exceeds the pre-set maximum value is as follows:

Equations (1) to (5) are solved implicitly, that is, values of the integration period T are found which satisfy $$\Theta_{Hsetting}=\Theta_H \quad (8)$$

The result is used in the manner described elsewhere, only if the value of T is between zero and thirty minutes.

The algorithm by which the loss of life is calculated and the time period before that loss of life exceeds the pre-set maximum value setting is as follows:

Equation (7) is solved implicitly, for T, given the setting for excessive loss of life limit $L=L_{setting}$:

$$L_{setting} = \int_0^T \left[\frac{dL}{dt}\right] dt \quad (9)$$

The result is used in the manner described elsewhere, only if the value of T is between zero and thirty minutes.

FIG. 1 shows the scenario for a sudden increase in power transfer through the transformer that is, a sudden increase in the load current at time 6 hours, labeled "A" in the figure.

At "B" in the figure, the resulting sudden rise in the hotspot temperature crosses the "NORMAL RATED HOT SPOT level, which starts the ACCUM. LOSS OF LIFE integration, at "C".

At "D," about 12:15 hours on the time scale, the FIRST WARNING ALARM is activated.

At "E," about 12:30 hours on the time scale, the SECOND WARNING ALARM is activated.

At "F," about 12:45 hours on the time scale, a TRIP is actuated: "G."

If the warnings are heeded, between "D" and "G" and the load current is reduced by the operators, then the TRIP may be avoided, that being the reason for the warnings.

Since various modifications can be made in our invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An apparatus for predicting an overload trip condition for an electrical power transformer supplying a load current, the apparatus comprising:
   a current sensing means for providing a first signal indicative of the load current;
   a temperature sensing means for providing a second signal selectively indicative of ambient temperature external to the transformer or transformer temperature at a selected location; and
   a signal processor for deriving from said first and second signals an estimated time value, T, representative of the estimated time before an occurring overload trip condition of the transformer at the present load current.

2. The apparatus of claim 1 wherein said signal processor provides a first alarm signal when said time value, T, is less than a first preselected time value.

3. The apparatus of claim 2 wherein said signal processor provides a second alarm signal when said time value, T, is less than a second preselected time value greater than said first preselected time value.

4. The apparatus according to claim 2 wherein the signal processor is arranged to cancel the first alarm signal in the event that a subsequent calculated time value, T, is greater than the first predetermined time value.

5. The apparatus of claim 1 wherein said signal processor includes:
   computational means for estimating the hot spot temperature $\Theta_H$ of the transformer as a function of said first and second signals, wherein said hot spot temperature is an estimate of the hottest spatial location within the transformer, and
   computational means for deriving said time value, T, as a function of said estimated hot spot temperature and a preselected loss of life value, $L_{set}$.

6. The apparatus of claim 5 wherein said time value, T, satisfies the time integral of the rate of change of transformer loss of life factor, L, mathematically described by:

$$L_{set} = \int_0^T \frac{dL}{dt} dt \text{ and } L = \text{a function of } \Theta_H.$$

7. The apparatus according to claim 6 wherein said time integral is determined over only time that the hot spot temperature $\Theta_H$ exceeds its normal rated value.

8. The apparatus according to claim 7 wherein said time integral is evaluated over successive time increments where $\Theta_H$ exceeds its normal rated value, and said time integral is reset to zero whenever the hot spot temperature $\Theta_H$ falls below its normal rated value.

9. The apparatus according to claim 1 further comprising a time display coupled to said signal processor for indicating the remaining portion of time from the present time to the time at which one of said first or second preselected time values is exceeded.

10. The apparatus of claim 1 wherein said signal processor includes:
    computational means for estimating the hot spot temperature $\Theta_H$ of the transformer as a function of said first and second signals, wherein said hot spot temperature is an estimate of the hottest spatial location within the transformer,
    computational means for deriving said time value, T, as a function of said estimated hot spot temperature and a preselected loss of life value, $L_{set}$, and
    said signal processor provides a first alarm signal when said time value, T, is less than a first preselected time value, or the hot spot temperature $\Theta_H$ exceeds, a selected temperature value regardless of whether or not said time value is less than said first preselected time value.

11. The apparatus according to claim 1 wherein said transformer temperature at a selected location is within oil surrounding the transformer.

12. A method for predicting an overload trip condition for an electrical power transformer supplying a load current, the method comprising the steps of:
    sensing the load current and providing a first signal indicative thereof;
    selectively sensing ambient temperature external to the transformer or transformer temperature at a selected location and providing a second signal indicative thereof;
    deriving an estimated time value, T, representative of the estimated time before an occurring overload trip condition of the transformer at the present load current, wherein said time value, T, is derived from values of said first and second signals.

13. The method of claim 12 further including the step of:
    estimating the hot spot temperature $\Theta_H$ of the transformer as a function of said first and second signals, wherein said hot spot temperature is an estimate of the hottest spatial location within the transformer; and
    deriving said time value, T, as a function of said estimated hot spot temperature and a preselected loss of life value, $L_{set}$.

14. The method of claim 13 wherein said time value, T, satisfies the time integral of the rate of change of transformer loss of life factor, L, mathematically described by:

$$L_{set} = \int_0^T \frac{dL}{dt} dt \text{ and } L = \text{a function of } \Theta_H.$$

15. The method of claim 14 wherein said time integral is evaluated over successive time increments where $\Theta_H$ exceeds its normal rated value, and said time integral is reset to zero whenever the hot spot temperature $\Theta_H$ falls below its normal rated value.

16. The method of claim 12 further including the step of estimating the hot spot temperature $\Theta_H$ of the transformer as a function of said first and second signals, wherein said hot spot temperature is an estimate of the hottest spatial location within the transformer.

17. The method of claim 16 further including the step of issuing an alarm signal when either said time value, T, is less than a first preselected time value or the hot spot temperature $\Theta_H$ of the transformer is greater than a preselected temperature value.

18. The method of claim 12 further including the step of issuing an alarm signal when said time value, T, is less than a first preselected time value.

19. An apparatus for predicting an overload trip condition for an electrical power transformer supplying a load current comprising:
    a current sensing means for providing a first signal indicative of the load current;
    a temperature sensing mean for providing a second signal indicative of the hot spot temperature $\Theta_H$, wherein said hot spot temperature is an estimate of the hottest spatial location within the transformer; and
    a signal processor for deriving from said first and second signals an estimated a time value, T, representative of the estimated time before an occurring overload trip condition of the transformer at the present load current.

20. The apparatus of claim 19 wherein said signal processor provides a first alarm signal when said time value, T, is less than a first preselected time value or said hot spot temperature $\Theta_H$ exceeds a preselected value.

21. The apparatus of claim 19 further comprises:
    a temperature sensing means for providing a second signal selectively indicative of ambient temperature external to the transformer or transformer temperature at a selected location; and
    wherein said signal processor includes computational means for estimating the hot spot temperature $\Theta_H$ of the transformer as a function of said first and second signals, and
    computational means for deriving said estimated time value, T, as a function of said estimated hot spot temperature and a preselected loss of life value, $L_{set}$.

22. The apparatus of claim 21 wherein said time value, T, satisfies the time integral of the rate of change of transformer loss of life factor, L, mathematically described by:

$$L_{set} = \int_0^T \frac{dL}{dt} dt \text{ and } L = \text{a function of } \Theta_H.$$

23. The apparatus according to claim 19 wherein said transformer temperature at a selected location is within oil surrounding the transformer.

24. An apparatus for predicting an overload trip condition for an electrical power transformer supplying a load current, the apparatus comprising:
    a current sensing means for providing a first signal indicative of the load current;
    a temperature sensing means for providing a second signal selectively indicative of ambient temperature external to the transformer or transformer temperature at a selected location; and
    a signal processor for deriving from said first and second signals an estimated time value, T, representative of the estimated time before an occurring overload trip condition of the transformer at the present load current, wherein said signal processor includes,
        computational means for estimating the hot spot temperature $\Theta_H$ of the transformer as a function of said first and second signals, wherein said hot spot temperature is an estimate of the hottest spatial location within the transformer,
        computational means for deriving said time value, T, as a function of said estimated hot spot temperature and a preselected loss of life value, $L_{set}$, and
        wherein said time value, T, satisfies the time integral of the rate of change of transformer loss of life factor, L, mathematically described by:

$$L_{set} = \int_0^T \frac{dL}{dt} dt \text{ and } L = \text{a function of } \Theta_H.$$

25. The apparatus according to claim 24, wherein said time integral is determined over only time that the hot spot temperature $\Theta_H$ exceeds its normal rated value.

26. The apparatus according to claim 25 wherein said time integral is evaluated over successive time increments where $\Theta_H$ exceeds its normal rated value, and said time integral is reset to zero whenever the hot spot temperature $\Theta_H$ falls below its normal rated value.

27. An apparatus for predicting an overload trip condition for an electrical power transformer supplying a load current, the apparatus comprising:
    a current sensing means for providing a first signal indicative of the load current;
    a temperature sensing means for providing a second signal selectively indicative of ambient temperature external to the transformer or transformer temperature at a selected location;
    a signal processor for deriving from said first and second signals an estimated time value, T, representative of the estimated time before an occurring overload trip condition of the transformer at the present load current; and
    a time display coupled to said signal processor for indicating the remaining portion of time from the present time to the time at which one of said first or second preselected time values is exceeded.

28. A method for predicting an overload trip condition for an electrical power transformer supplying a load current, the method comprising the steps of:
    sensing the load current and providing a first signal indicative thereof;
    selectively sensing ambient temperature external to the transformer or transformer temperature at a selected location and providing a second signal indicative thereof;
    deriving an estimated time value, T, representative of the estimated time before an occurring overload trip condition of the transformer at the present load current, wherein said time value, T, is derived from values of said first and second signals;

estimating the hot spot temperature $\Theta_H$ of the transformer as a function of said first and second signals, wherein said hot spot temperature is an estimate of the hottest spatial location within the transformer; and deriving said time value, T, as a function of said estimated hot spot temperature and a preselected loss of life value, $L_{set}$, wherein said time value, T, satisfies the time integral of the rate of change of transformer loss of life factor, L, mathematically described by:

$$L_{set} = \int_0^T \frac{dL}{dt} dt \text{ and } L = \text{a function of } \Theta_H.$$

29. The method of claim 28 wherein said time integral is evaluated over successive time increments where $\Theta_H$ exceeds its normal rated value, and said time integral is reset to zero whenever the hot spot temperature $\Theta_H$ falls below its normal rated value.

30. An apparatus for predicting an overload trip condition for an electrical power transformer supplying a load current comprising:
  a current sensing means for providing a first signal indicative of the load current;
  a temperature sensing mean for providing a second signal indicative of the hot spot temperature $\Theta_H$, wherein said hot spot temperature is an estimate of the hottest spatial location within the transformer;
  a temperature sensing means for providing a second signal selectively indicative of ambient temperature external to the transformer or transformer temperature at a selected location;
  a signal processor for deriving from said first and second signals an estimated time value, T, representative of the estimated time before an occurring overload trip condition of the transformer at the present load current;
  wherein said signal processor includes,
    computational means for estimating the hot spot temperature $\Theta_H$ of the transformer as a function of said first and second signals, and
    computational means for deriving said estimated time value, T, as a function of said estimated hot spot temperature and a preselected loss of life value, $L_{set}$, and wherein said time value, T, satisfies the time integral of the rate of change of transformer loss of life factor, L, mathematically described by:

$$L_{set} = \int_0^T \frac{dL}{dt} dt \text{ and } L = \text{a function of } \Theta_H$$

and L=a function of $\Theta_H$.

31. The apparatus according to claim 30 wherein said transformer temperature at a selected location is within oil surrounding the transformer.

* * * * *